United States Patent
Kim et al.

(10) Patent No.: US 10,089,068 B2
(45) Date of Patent: *Oct. 2, 2018

(54) ELECTRONIC DEVICE, SERVER AND CONTROL METHOD THEREOF

(71) Applicant: SAMSUNG ELECTRONICS CO., LTD., Gyeonggi-do (KR)

(72) Inventors: Do-wan Kim, Gunpo-si (KR); Oh-yun Kwon, Seoul (KR); Tae-hwan Cha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

This patent is subject to a terminal disclaimer.

(21) Appl. No.: 13/960,680

(22) Filed: Aug. 6, 2013

(65) Prior Publication Data

US 2014/0095176 A1 Apr. 3, 2014

Related U.S. Application Data

(63) Continuation of application No. 13/710,524, filed on Dec. 11, 2012.

(30) Foreign Application Priority Data

Sep. 28, 2012 (KR) .......................... 10-2012-0109453
Oct. 22, 2012 (KR) .......................... 10-2012-0117193

(51) Int. Cl.
*G10L 15/00* (2013.01)
*G06F 3/16* (2006.01)
(Continued)

(52) U.S. Cl.
CPC .............. *G06F 3/167* (2013.01); *G10L 15/22* (2013.01); *G10L 15/30* (2013.01); *H04N 5/4403* (2013.01);
(Continued)

(58) Field of Classification Search
CPC ......... G10L 15/00; G10L 15/22; G10L 15/26; G10L 15/265; G10L 2015/22;
(Continued)

(56) References Cited

U.S. PATENT DOCUMENTS 6,188,985 B1 2/2001 Thrift et al.
6,408,272 B1 6/2002 White et al.
(Continued)

FOREIGN PATENT DOCUMENTS

CN 1448915 A 10/2003
CN 1905007 A 1/2007
(Continued)

OTHER PUBLICATIONS

Communication, dated Jun. 19, 2013, issued by the European Patent Office in counterpart European Patent Application No. 12196969.5.
(Continued)

*Primary Examiner* — Paras D Shah
(74) *Attorney, Agent, or Firm* — Sughrue Mion, PLLC

(57) ABSTRACT

Provided are a display apparatus, a control method thereof, a server, and a control method thereof. The display apparatus includes: a processor which processes a signal; a display which displays an image based on the processed signal; a first command receiver which receives a voice command; a storage which stores a plurality of voice commands said by a user; a second command receiver which receives a user's manipulation command; and a controller which, upon receiving the voice command, displays a list of the stored plurality of voice commands, selects one of the plurality of voice commands of the list according to the received user's manipulation command and controls the processor to process based on the selected voice command.

14 Claims, 14 Drawing Sheets

(51) Int. Cl.
| | |
|---|---|
| *G10L 15/30* | (2013.01) |
| *G10L 15/22* | (2006.01) |
| *H04N 5/44* | (2011.01) |
| *H04N 21/231* | (2011.01) |
| *H04N 21/233* | (2011.01) |
| *H04N 21/422* | (2011.01) |
| *H04N 21/433* | (2011.01) |
| *H04N 21/439* | (2011.01) |
| *H04N 21/6543* | (2011.01) |
| *H04N 21/6547* | (2011.01) |
| *H04N 21/658* | (2011.01) |

(52) U.S. Cl.
CPC ......... *H04N 21/231* (2013.01); *H04N 21/233* (2013.01); *H04N 21/2335* (2013.01); *H04N 21/42203* (2013.01); *H04N 21/433* (2013.01); *H04N 21/4394* (2013.01); *H04N 21/6543* (2013.01); *H04N 21/6547* (2013.01); *H04N 21/6582* (2013.01); *G10L 2015/223* (2013.01)

(58) Field of Classification Search
CPC ......... G10L 2015/221; G10L 2015/223; G10L 2015/225; G10L 2015/228; B60R 16/0373; G01C 21/3608; A63F 13/00; H04M 3/4936; G06F 3/16
USPC .............................. 704/231, 270, 270.1, 275
See application file for complete search history.

(56) References Cited

U.S. PATENT DOCUMENTS

| | | | |
|---|---|---|---|
| 6,535,854 B2 | 3/2003 | Buchner et al. | |
| 6,654,721 B2* | 11/2003 | Handelman | 704/270 |
| 6,762,692 B1 | 7/2004 | Mingot et al. | |
| 6,889,188 B2 | 3/2005 | Metzler et al. | |
| 7,003,463 B1 | 2/2006 | Maes et al. | |
| 7,006,973 B1* | 2/2006 | Genly | 704/275 |
| 7,085,716 B1 | 8/2006 | Even et al. | |
| 7,272,455 B2* | 9/2007 | Tajika | 700/65 |
| 7,379,876 B2* | 5/2008 | Nakata | 704/275 |
| 7,392,193 B2* | 6/2008 | Mault | 704/275 |
| 7,529,677 B1 | 5/2009 | Wittenberg | |
| 7,809,562 B2 | 10/2010 | Hanazawa | |
| 8,150,699 B2* | 4/2012 | Patch | 704/275 |
| 8,224,644 B2 | 7/2012 | Krumel et al. | |
| 8,421,932 B2 | 4/2013 | Ouchi et al. | |
| 8,438,024 B2* | 5/2013 | White | 704/235 |
| 2002/0052746 A1* | 5/2002 | Handelman | 704/270 |
| 2002/0095294 A1 | 7/2002 | Korfin et al. | |
| 2002/0120455 A1* | 8/2002 | Nakata | G06F 3/04812 704/275 |
| 2003/0120493 A1 | 6/2003 | Gupta | |
| 2004/0006477 A1 | 1/2004 | Craner | |
| 2004/0010409 A1 | 1/2004 | Ushida et al. | |
| 2004/0176958 A1* | 9/2004 | Salmenkaita et al. | 704/275 |
| 2005/0102141 A1 | 5/2005 | Chikuri | |
| 2005/0273334 A1* | 12/2005 | Schleifer | G10L 15/08 704/255 |
| 2006/0079291 A1 | 4/2006 | Granovetter et al. | |
| 2006/0106614 A1* | 5/2006 | Mowatt et al. | 704/275 |
| 2006/0190255 A1* | 8/2006 | Fukada | 704/251 |
| 2006/0206335 A1 | 9/2006 | Thelen et al. | |
| 2006/0235701 A1 | 10/2006 | Cane et al. | |
| 2007/0027693 A1 | 2/2007 | Hanazawa | |
| 2007/0276651 A1* | 11/2007 | Bliss | G10L 15/30 704/9 |
| 2008/0300884 A1 | 12/2008 | Smith | |
| 2009/0018830 A1* | 1/2009 | Emmanuel | 704/235 |
| 2010/0131280 A1 | 5/2010 | Bogineni | |
| 2010/0318357 A1 | 12/2010 | Istvan et al. | |
| 2010/0333163 A1* | 12/2010 | Daly | 725/133 |
| 2011/0066634 A1 | 3/2011 | Phillips et al. | |
| 2011/0087492 A1* | 4/2011 | Yoshida | G10L 15/08 704/240 |
| 2011/0106534 A1 | 5/2011 | LeBeau et al. | |
| 2011/0184740 A1 | 7/2011 | Gruenstein et al. | |
| 2012/0078635 A1 | 3/2012 | Rothkopf et al. | |
| 2012/0127072 A1 | 5/2012 | Kim | |
| 2012/0162540 A1 | 6/2012 | Ouchi et al. | |
| 2012/0170572 A1 | 7/2012 | Bareli et al. | |
| 2012/0173238 A1 | 7/2012 | Mickelsen et al. | |
| 2012/0176313 A1* | 7/2012 | Ryu et al. | 345/158 |
| 2012/0179471 A1 | 7/2012 | Newman et al. | |
| 2012/0330651 A1* | 12/2012 | Obuchi | G10L 15/30 704/225 |
| 2013/0132084 A1 | 5/2013 | Stonehocker et al. | |
| 2013/0183944 A1 | 7/2013 | Mozer et al. | |
| 2013/0185072 A1 | 7/2013 | Huang et al. | |
| 2014/0052451 A1* | 2/2014 | Cheong et al. | 704/275 |

FOREIGN PATENT DOCUMENTS

| | | |
|---|---|---|
| EP | 0 854 417 A2 | 7/1998 |
| JP | 2003-131682 A | 5/2003 |
| JP | 2003-295893 A | 10/2003 |
| JP | 2005-249829 A | 9/2005 |
| JP | 2006-3696 A | 1/2006 |
| JP | 2007-33901 A | 2/2007 |
| JP | 2012-88370 A | 5/2012 |
| JP | 2012-133243 A | 7/2012 |
| JP | 2012-168349 A | 9/2012 |
| RU | 2 391 716 C2 | 6/2010 |
| WO | 00/58942 A2 | 10/2000 |
| WO | 2011/163538 A1 | 12/2011 |

OTHER PUBLICATIONS

Communication, dated Jun. 6, 2013, issued by the European Patent Office in counterpart European Patent Application No. 12196969.5.
Communication, dated Aug. 13, 2013, issued by the Japanese Patent Office in counterpart Japanese Patent Application No. 2012-272762.
Communication dated Oct. 30, 2014 issued by the European Patent Office in counterpart European Patent Application No. 12 196 969.5.
Communication dated Dec. 31, 2014 issued by the United States Patent and Trademark Office in counterpart U.S. Appl. No. 13/710,524.
Communication dated Feb. 19, 2013 issued by the German Patent Office in counterpart German Application No. 20 2012 104 855.8.
Communication dated Apr. 16, 2013 issued by the Japanese Patent Office in counterpart Japanese Patent Application No. 2012-272762.
Communication dated Apr. 22, 2013 issued by the Korean Intellectual Property Office in counterpart Korean Patent Application No. 10-2012-0117193.
Communication dated Apr. 24, 2013 isued by the International Searching Authority in counterpart International Application No. PCT/KR2012/010255.
Nakano, et al., "Extensible Speech Recognition System Using Proxy-Agent", Department of Computer Science, Waseda University, 2007, pp. 601-606.
Communication dated May 30, 2014 issued by the European Patent Office in counterpart European Patent Application No. 14161308.3.
Communication dated Aug. 5, 2014 issued by the Australian Patent Office in counterpart Australian Patent Application No. 2012261531.
Communication, dated Feb. 7, 2014, issued by the European Patent Office in counterpart European Application No. 12 196 969.5.
Communication, dated Jan. 22, 2014, issued by the U.S. Patent and Trademark Office in counterpart U.S. Appl. No. 13/846,383.
Communication dated Feb. 25, 2016 issued by the State Intellectual Property Office of P.R. China in counterpart Chinese Application No. 201210585173.5.
Communication dated Dec. 23, 2015 issued by United States Patent and Trademark Office in counterpart U.S. Appl. No. 13/846,383.
Communication dated May 25, 2016, issued by the United States Patent and Trademark Office in counterpart U.S. Appl. No. 13/710,524.
Communication dated Jul. 7, 2015 by the European Patent Office in related Application No. 12196969.5.

(56) References Cited

OTHER PUBLICATIONS

Non Final Office Action dated Aug. 7, 2015 by the United States Patent and Trademark Office in related U.S. Appl. No. 13/846,383.
Communication dated Oct. 24, 2016, issued by the State Intellectual Property Office of P.R. China in counterpart Chinese application No. 201210585173.5.
Communication dated Nov. 10, 2016, issued by the Russian Patent Office in counterpart Russian application No. 2015111180/08(017460).
Communication dated Jan. 4, 2017, issued by the Japanese Patent Office in counterpart Japanese application No. 2013-256372.
Communication dated Feb. 28, 2017 issued by the State Intellectual Property Office of P.R. China in counterpart Chinese Patent Application No. 201210585173.5.
Communication dated Mar. 24, 2017 by the Federal Service on Intellectual Property in counterpart Russian Patent Application No. 2015111180.
Communication dated Jun. 1, 2017 by the European Patent Office in counterpart European Patent Application No. 14161308.3.
Communication dated Jul. 17, 2017 by the State Intellectual Property Office of P.R. China in counterpart Chinese Patent Application No. 201210585173.5.
Communication dated Feb. 12, 2018 issued by the Intellectual Property Office of India in counterpart Indian Application No. 5184/CHE/2012.
Communication dated Oct. 4, 2013 issued by the Korean State Intellectual Property Office in counterpart Korean Patent Application No. 1020120117193.
Communication dated Oct. 21, 2013 issued by the Australian Patent Office in counterpart Australian Patent Application No. 2012261531.
Communication dated Sep. 6, 2013 issued by the United States Patent and Trademark Office in counterpart U.S. Appl. No. 13/846,383.
Communication dated Jul. 31 2018, from the State Intellectual Property Office of People's Republic of China in counterpart Application No. 201210585173.5.

* cited by examiner

FIG. 14

| | (USER 1) STORED VOICE COMMAND LIST |
|---|---|
| 1 | TELL ME ABOUT TOMORROW'S WEATHER |
| 2 | PLAY ### |
| 3 | PLAY %%% |
| 4 | |

RECORD $$$ NEWS

141

ELECTRONIC DEVICE, SERVER AND CONTROL METHOD THEREOF

CROSS-REFERENCE TO RELATED APPLICATIONS

This is a continuation of U.S. patent application Ser. No. 13/710,524, filed on Dec. 11, 2012, which claims priority from Korean Patent Application Nos. 10-2012-0109453, filed on Sep. 28, 2012, and 10-2012-0117193, filed on Oct. 22, 2012 in the Korean Intellectual Property Office, the disclosures of which are incorporated herein by reference in their entireties.

BACKGROUND

Field

Apparatuses and methods consistent with exemplary embodiments relate to an electronic device, a server, and control methods thereof, and more particularly, to an electronic device, a server, and control methods thereof which recognize a user's command and operate under the command by using the server.

Description of the Related Art

An electronic device such as a television (TV), a set-top box, a Digital Versatile Disc (DVD) player, an air-conditioner, a refrigerator, and a computer operates under a user's command. The electronic device is controlled by various types of commands such as a voice recognition through a microphone, in line with the development of technology and diversification of functions beyond a traditional input method using a remote controller. In the case of an electronic device such as a TV, if a user says, "Change the volume to 20," the electronic device receives and interprets a voice signal through voice recognition technology and changes the volume to 20 accordingly.

The electronic device utilizes a command recognition configuration to properly interpret a user's command. However, an electronic device may not be able to accurately interpret the command. In this case, an external server through a network may be used. More specifically, to recognize voice, the electronic device transmits content of a user's voice command to the server, which interprets and determines a user's intention regarding the voice command by using a voice recognition configuration provided in the server. The server transmits the analysis result to the electronic device, which may perform a corresponding function by using the analysis result.

However, if a related art electronic device may not identify a user's command by itself, the electronic device is to communicate with the server and receive the analysis result from the server. Accordingly, communication time between the electronic device and the server through the network cannot but be taken to perform functions according to the analysis result. The communication time which is taken to obtain the analysis result regarding the user's command depends on the state of the network or the communication frequency, but fundamentally delays the time for recognizing the user's command and performing the corresponding function.

SUMMARY

Accordingly, one or more exemplary embodiments provide an electronic device, a server, and control methods thereof which minimize the time for recognizing a user's command and performing an operation.

According to an aspect of an exemplary embodiment, there is provided a display apparatus including: a processor which processes a signal; a display which displays an image based on the processed signal; a command receiver which receives a user's voice command; a communicator which communicates with a first server; a storage; and a controller which receives, from the first server, a voice recognition command list including a voice recognition command and corresponding control command information and stores the list in the storage, the voice recognition command being among user's voice commands which have successfully been recognized a predetermined number of times or more and in response to receiving a user's voice command, identifies whether the voice command corresponds to the voice recognition command included in the voice recognition command list, and if so, controls the processor to operate based on the control command information of the corresponding voice recognition command, and if not, transmits the voice command to the first server, receives corresponding control command information from the first server, and controls the processor to operate based on the received control command information.

The controller may determine whether the voice command corresponds to the voice recognition command in the voice recognition command list based on a determined relevance between the voice command and the voice recognition command.

If predetermined time or more elapses after the voice command is transmitted to the first server, the controller may control the image processor to operate based on the voice recognition command in the voice recognition command list.

The controller may notify a user of a content of the voice recognition command in the voice recognition command list in advance, and determine whether to operate based on the voice recognition command according to a user's intention.

If the received voice command is newly recognized for a user, the controller may transmit the recognized voice command and corresponding control command information to the first server.

The controller may transmit the user's voice command to a second server, receive a text into which the voice command has been converted, from the second server, and transmits the received text to the first server.

The controller may store in the storage voice commands for each user, and display a list of the stored voice commands in the form of a user interface (UI).

The controller may register an identification symbol corresponding to the voice command under a user's instruction, and in response to the registered identification symbol being said by the user, determine that the voice command has been received.

If a location where a voice command is arranged in the list is said, the controller may determine that the voice command has been received.

According to an aspect of another exemplary embodiment, there is provided a control method of a display apparatus, the control method including: receiving a voice recognition command list and corresponding control command information from a first server, the voice recognition command being among user's voice commands which have successfully been recognized a predetermined number of times or more; storing the received voice recognition command list in the display apparatus; receiving a user's voice command; identifying whether the received voice command corresponds to the voice recognition command included in the stored voice recognition command list; operating according to the control command information of the voice recognition command if the received voice command corresponds to the voice recognition command; and transmitting the received voice command to the first server and receiving corresponding control command information from the first server and operating according to the received control command information if the received voice command does not correspond to the voice recognition command.

The identifying whether the received voice command corresponds to the voice recognition command included in the voice recognition command list may include determining whether the voice command corresponds to the voice recognition command in the voice recognition command list based on a determined relevance between the voice command and the voice recognition command.

The control method may further include operating based on the voice recognition command in the voice recognition command list if a predetermined time or more elapses after the voice command is transmitted to the first server.

The control method may further include notifying a user of a content of the voice recognition command in the voice recognition command list in advance and determining whether to operate based on the voice recognition command according to a user's intention.

The control method may further include, if the received voice command is newly recognized for a user, transmitting to the first server the recognized voice command and the corresponding control command information.

The control method may further include: transmitting the user's voice command to a second server; receiving a text to which the voice command has been converted, from the second server, and transmitting the received text to the first server.

The control method may further include: storing a voice command for each user, in the processing apparatus; and displaying a list of the stored voice commands in the form of a user interface (UI).

The control method may further include: registering an identification symbol corresponding to the voice command under a user's instruction, wherein the receiving the voice command includes determining that the corresponding voice command is received if the user says the registered identification symbol.

The receiving the voice command may include determining that the corresponding voice command is received if a user says a location where one voice command is arranged from the list.

According to an aspect of another exemplary embodiment, there is provided a server which analyzes a user's voice command to a display apparatus, the server including: a communicator which communicates with a display apparatus; a storage which stores information regarding a user's voice command; and a controller which, in response to receiving a request from the display apparatus for analysis of a user's voice command, transmits control command information corresponding to the voice command to the processing apparatus, stores in the storage a voice recognition command list including a voice recognition command and corresponding control command information, and transmits the stored voice recognition command list to the display apparatus, the voice recognition command being among user's voice commands which have successfully been recognized a predetermined number of times or more.

The controller may receive a user's voice command which has been successfully recognized, and corresponding control command information from the display apparatus, and prepare the voice recognition command list based on the received user's voice command and corresponding control command information.

According to an aspect of another exemplary embodiment, there is provided a control method of a server which analyzes a user's voice command to a display apparatus, the control method including: receiving a request from a display apparatus for analysis of the user's voice command; transmitting control command information corresponding to the voice command to the display apparatus; storing a voice recognition command list including a voice recognition command and corresponding control command information, the voice recognition command being among user's voice commands which have successfully been recognized a predetermined number of times or more; and transmitting the stored voice recognition command list to the display apparatus.

The control method may further include: receiving a user's voice command which has been successfully recognized, and corresponding control command information from the display apparatus, wherein the storing includes preparing the voice recognition command list based on the received user's voice command and corresponding control command information.

According to an aspect of another exemplary embodiment, there is provided a control method of a processing apparatus, the control method including: receiving a command from a user; determining whether the received command corresponds to a recognition command comprised in a stored recognition command list, the stored recognition command list including the recognition command and control command information corresponding to the recognition command; in response to determining that the received command corresponds to the recognition command included in the stored recognition command list, operating according to the control command information included in the recognition command list and corresponding to the recognition command; and, in response to determining that the received command does not correspond to the recognition command included in the stored recognition command list, transmitting the received command to a first server, receiving corresponding control command information from the first server, and operating according to the received control command information.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 13 and 14 illustrate an example of a voice command list which is stored per user according to an exemplary embodiment.

DETAILED DESCRIPTION OF EXEMPLARY EMBODIMENTS

Figure 1:
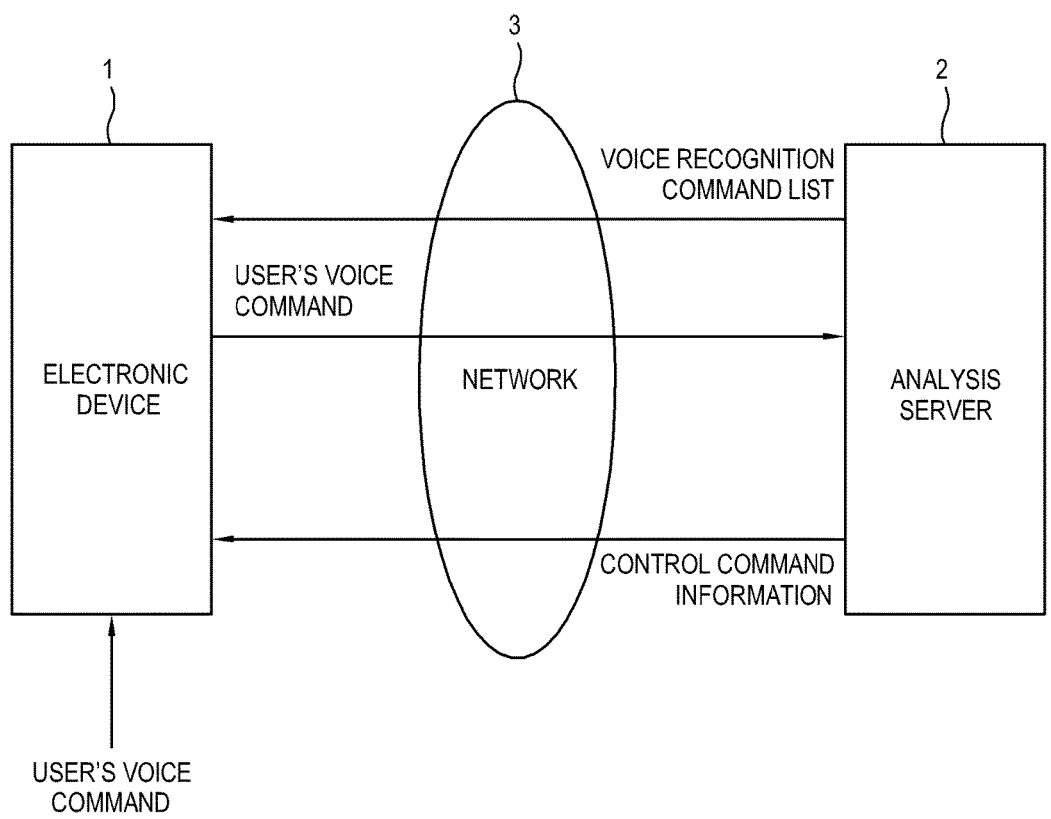
FIG. 1 is a block diagram of an electronic device and an analysis server according to an exemplary embodiment.

Below, exemplary embodiments will be described in detail with reference to accompanying drawings so as to be easily realized by a person having ordinary knowledge in the art. Exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an electronic device 1 and an analysis server 2 according to an exemplary embodiment. An electronic device 1 and an analysis server 2 according to an exemplary embodiment are connected to each other through a network 3. The electronic device 1 operates under a user's command and includes, e.g., household appliances or personal handsets such as a television (TV), a set-top box, a Digital Versatile Disc (DVD) player, an air-conditioner, a refrigerator, a computer, a mobile phone, a smart phone, a smart pad, etc., and office machines such as a printer and a photocopier and any other devices which operate based on electrical/electronic circuits.

A user's command according to the present exemplary embodiment includes information based on which the electronic device 1 may determine to perform a predetermined operation under a user's act. The electronic device 1 and the analysis server 2 analyze the user's command to identify the user's command. For example, the user's command may include at least one of a user's voice, a gesture, and a particular external appearance. Hereinafter, for convenience of description, the user's command will exemplarily be a voice command and the electronic device 1 includes a display apparatus such as a TV. However, it is understood that other exemplary embodiments are not limited thereto.

The network 3 according to the present exemplary embodiment includes a device or infrastructure which is used to exchange information regarding a user's voice command between the electronic device 1 and the analysis server 2, and may be a wired and/or wireless network.

The analysis server 2 is connected to the network 3, analyzes a service regarding a user's voice command, i.e., a user's voice command for the electronic device 1 as its client, and transmits the analysis result to the electronic device 1. The analysis server 2 according to the present exemplary embodiment transmits, to the electronic device 1, a voice recognition command list including a voice recognition command that is among user's voice commands which have successfully been recognized a predetermined number of times or more and corresponding control command information. The control command information is used to control the electronic device 1 to operate as desired by a user under the voice recognition command. The electronic device 1 identifies the user's voice command based on the voice recognition command list transmitted by the analysis server 2. That is, if the user's voice command is input, the electronic device 1 identifies whether the user's voice command corresponds to a voice recognition command included in the voice recognition command list, and if so, operates according to the control command information of the voice recognition command. Conversely, if the user's voice command does not correspond to a voice recognition command included in the voice recognition command list, the electronic device 1 transmits the user's voice command to the analysis server 2. The analysis server 2 analyzes the user's voice command transmitted by the electronic device 1 and transmits corresponding control command information to the electronic device 1. The electronic device 1 operates according to the control command information transmitted by the analysis server 2.

According to the present exemplary embodiment, instead of transmitting all user's voice commands to the analysis server 2, the electronic device 1 identifies the user's voice command based on the voice recognition command list transmitted in advance by the analysis server 2, and if the identification of the user's voice command is not available based on the received voice recognition command list, operates according to the control command information transmitted by the analysis server 2. Accordingly, communication time taken between the electronic device 1 and the analysis server 2 may be minimized, and the time for recognizing the user's voice command and performing the operation may be minimized.

Figure 2:
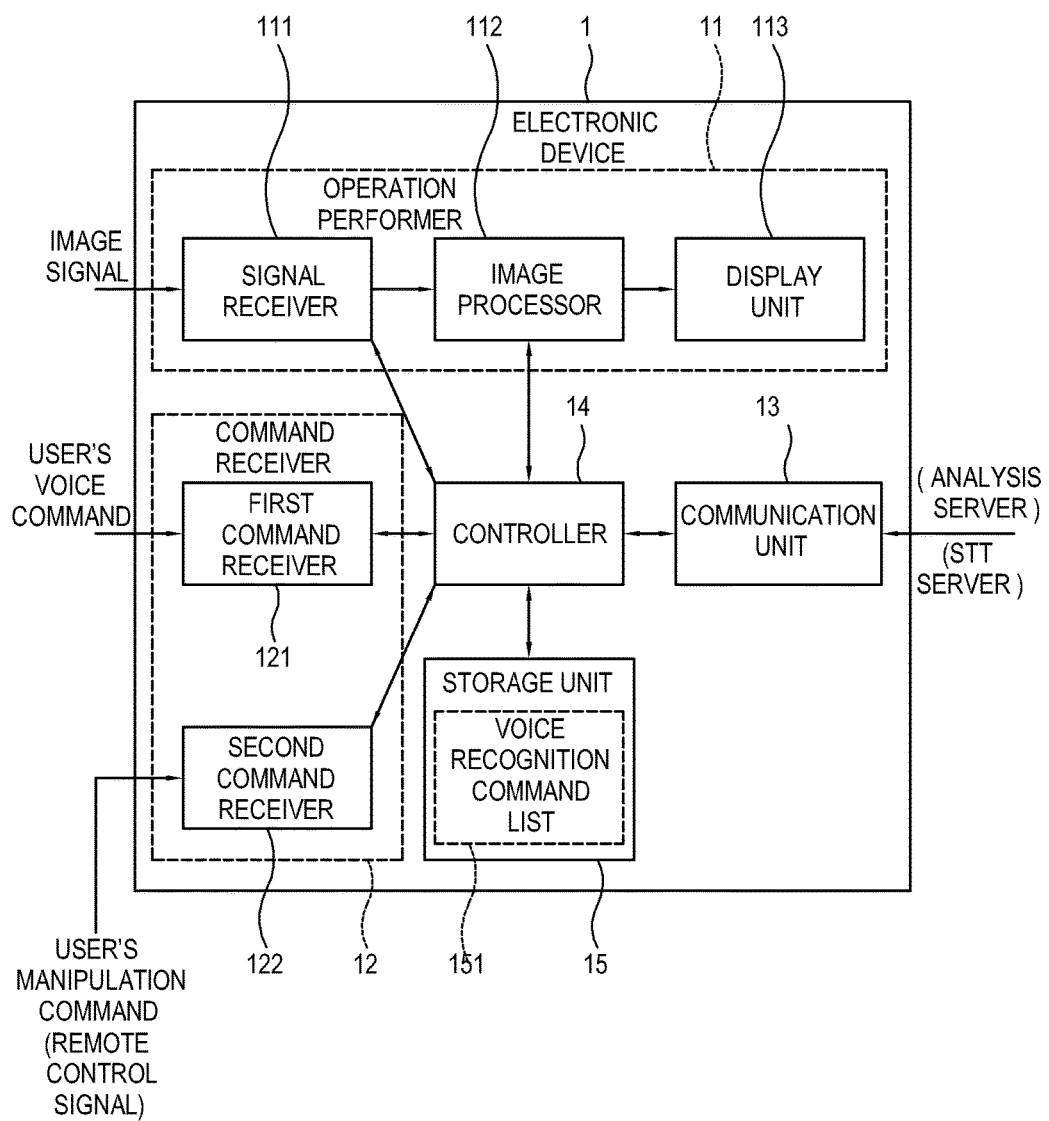
FIG. 2 is a block diagram of an electronic device according to an exemplary embodiment.

FIG. 2 is a block diagram of an electronic device 1 according to an exemplary embodiment. The electronic device 1 may include an operation performer 11, a command receiver 12, a communication unit 13 (e.g., communicator such as a wired and/or wireless interface, port, card, dongle, etc.), and a controller 14. The electronic device 1 may further include a storage unit 15 (e.g., a storage such as RAM, ROM, flash memory, a hard disk drive, etc.). The operation performer 11 performs operations of the electronic device 1. For example, if the electronic device 1 includes a display apparatus such as a TV, the operation performer 11 may include a signal receiver 111, an image processor 112, and a display unit 113 (e.g., a display such as a liquid crystal display panel, a plasma display panel, an organic light emitting diode display, etc.). However, it is understood that the operation performer 11 corresponds to operations of the product which realizes the electronic device 1, and is not limited to the example shown in FIG. 2.

The signal receiver 111 may receive an image signal included in a broadcasting signal transmitted by a broadcasting signal transmission apparatus (not shown), receive an image signal from a video device such as a DVD player, a Blu-ray Disc (BD) player, etc., receive an image signal from a personal computer (PC), receive an image signal from a mobile device such as a smart phone and a smart pad, receive an image signal through a network such as the Internet, or receive an image signal as image content stored in a storage medium such as a Universal Serial Bus (USB) storage medium.

The image processor 111 processes an image signal received by the signal receiver 111 to display an image. The image processor 112 may perform decoding, image enhancement, and scale operations. The display unit 113 displays an image thereon based on the image signal processed by the image processor 112. The image displaying method of the display unit 113 is not limited.

The command receiver 12 receives a user's voice command. For example, the command receiver 12 may include a first command receiver 121 to receive a user's voice command. The first command receiver 121 may include a microphone to convert a received user's voice command into a voice signal. The command receiver 12 may further include a second command receiver 122 to receive a user's manipulation command. The second command receiver 122 may be implemented as a remote control signal receiver which receives a remote control signal including key input information corresponding to a user's manipulation command from a remote controller (not shown) or as a manipulation panel which is provided in the electronic device 1 and generates key input information corresponding to a user's manipulation.

The communication unit 13 communicates with the analysis server 2 through the network 3. The communication unit 13 exchanges the user's voice command and the information regarding the analysis result with the analysis server 2 under a control of the controller 14.

The controller 14 controls the operation performer 11 to perform operations under a user's voice command. In response to receiving a voice recognition command list 151 from the analysis server 2 through the communication unit 13, the controller 14 stores the received voice recognition command list 151 in the storage unit 15. In response to receiving a user's voice command through the command receiver 12, the controller 14 identifies whether the user's voice command corresponds to a voice recognition command included in the stored voice recognition command list 151, and if so, controls the operation performer 11 to perform operations according to the control command information corresponding to the voice recognition command included in the stored voice recognition command list 151. If the user's voice command does not correspond to a voice recognition command included in the stored voice recognition command list 151, the controller 14 controls the communication unit 13 to transmit the user's voice command to the analysis server 2, and in response to receiving control command information corresponding to the transmitted voice command from the analysis server 2, controls the operation performer 11 to perform operations according to the received control command information.

The controller 14 may include a central processing unit (CPU), and may execute a control program for operation. The controller 14 may further include a non-volatile memory such as a flash memory to store a control program therein, and a volatile memory such as a double data rate (DDR) memory to load at least a part of the stored control program for prompt access by the CPU. The control program of the controller 14 is programmed to control the operations of the operation performer 11.

Figure 3:
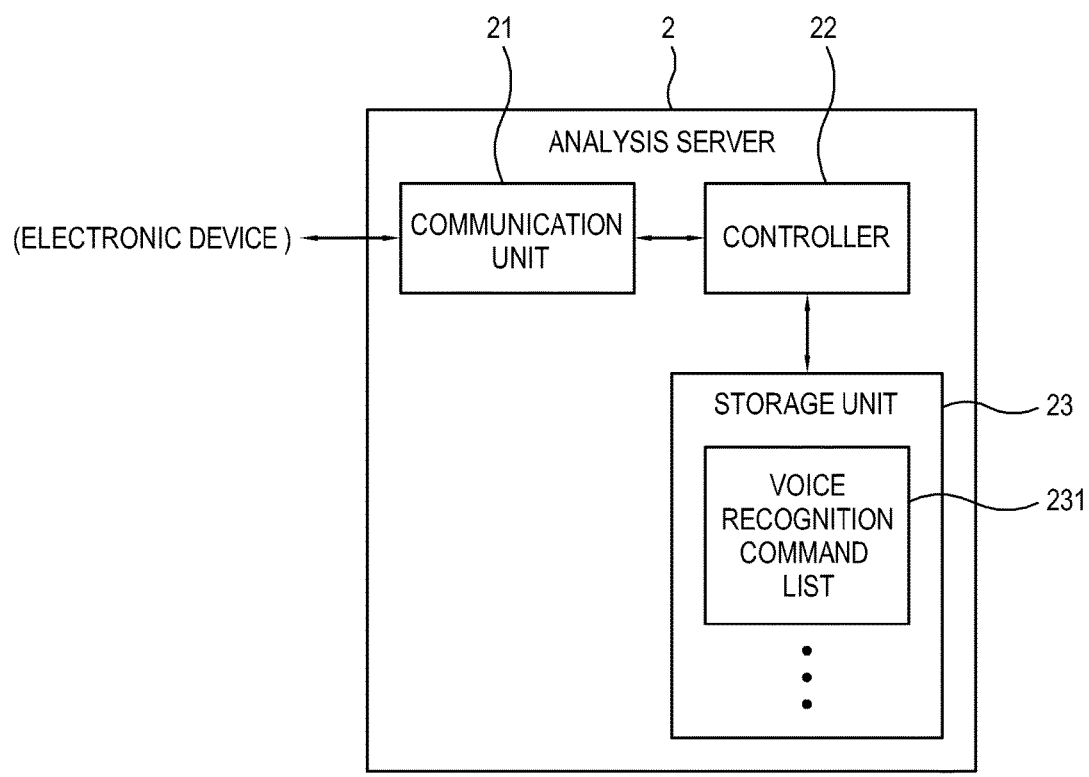
FIG. 3 is a block diagram of an analysis server according to an exemplary embodiment.

FIG. 3 is a block diagram of an analysis server 2 according to an exemplary embodiment. The analysis server 2 includes a communication unit 21 (e.g., communicator such as a wired and/or wireless interface, port, card, dongle, etc.), a controller 22, and a storage unit 23 (e.g., a storage such as ROM, flash memory, a hard disk drive, etc.). The communication unit 21 communicates with the communication unit 13 of the electronic device 1 through the network 3. The controller 22 controls operations of the analysis server 2. The storage unit 23 as a non-volatile memory stores therein a voice recognition command list 231 corresponding to a user's voice command. The controller 22 controls the communication unit 21 to transmit the voice recognition command list 231 stored in the storage unit 23 to the electronic device 1. In response to receiving a user's voice command and an analysis request for the user's voice command from the electronic device 1, the controller 22 analyzes the received user's voice command. The controller 22 controls the communication unit 21 to transmit the analysis result of the user's voice command to the electronic device 1.

Figure 4:
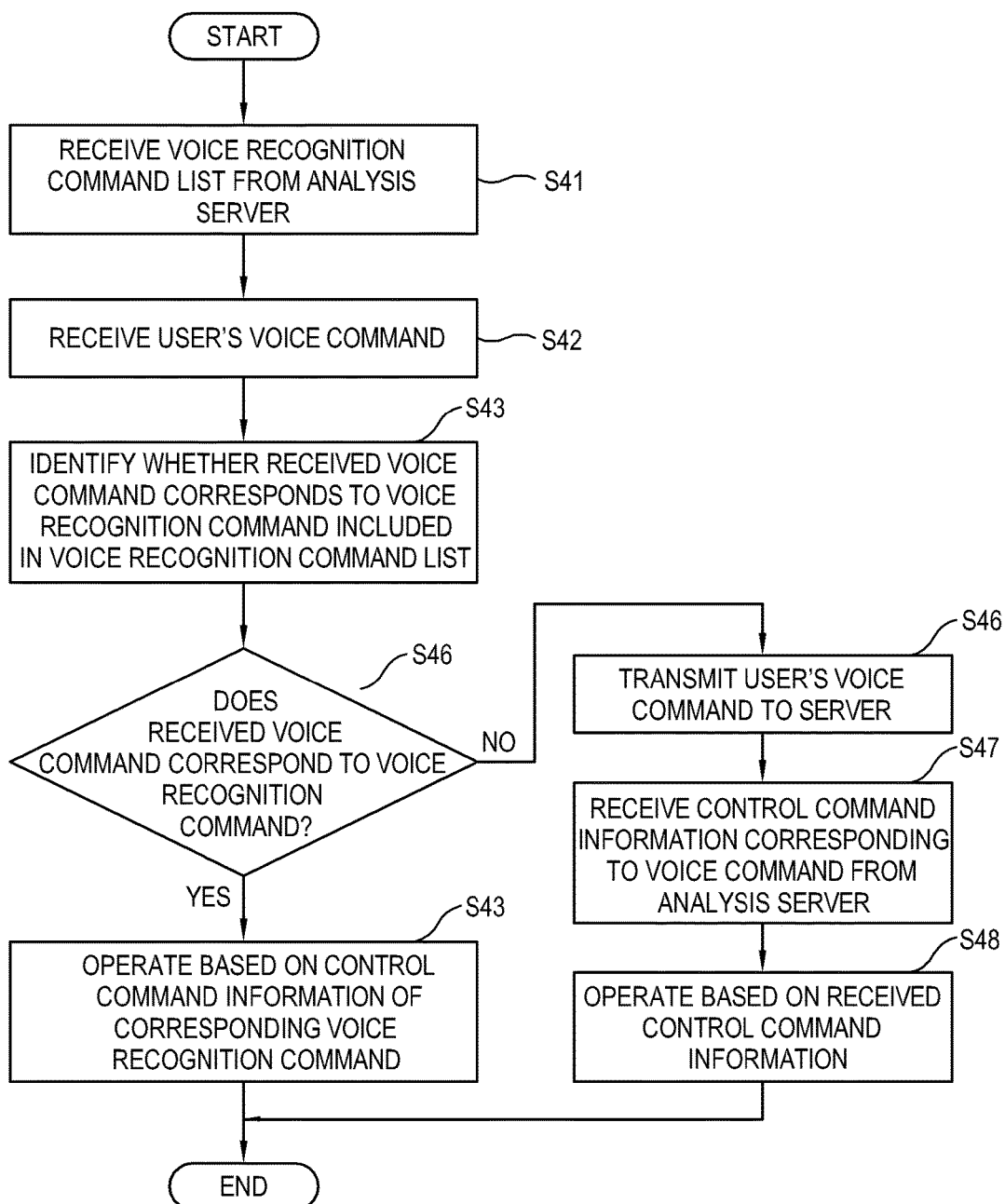
FIG. 4 is a flowchart showing operations of an electronic device according to an exemplary embodiment.
Figure 5:
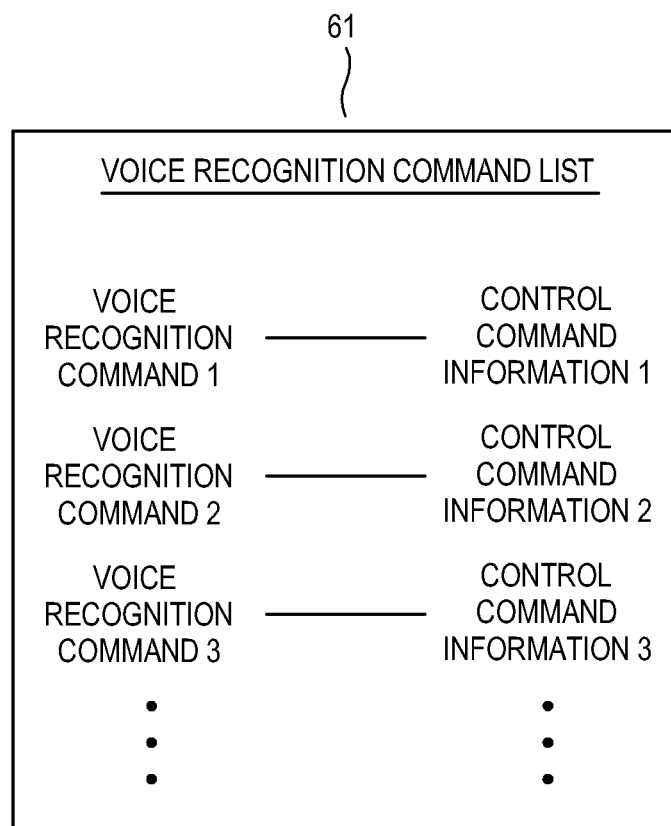
FIG. 5 illustrates an example of a voice recognition command list according to an exemplary embodiment.

FIG. 4 is a flowchart showing operations of the electronic device 1 according to an exemplary embodiment. At operation S41, the electronic device 1 receives the voice recognition command list 151 from the analysis server 2. The received voice recognition command list 151 may be stored in the storage unit 15. FIG. 5 illustrates an example of the voice recognition command list 151 according to an exemplary embodiment. The voice recognition command list 151 may include a plurality of voice recognition commands ('voice recognition command 1', 'voice recognition command 2', 'voice recognition command 3', etc.), and a plurality of control command information ('control command information 1', 'control command information 2', 'control command information 3', etc.) corresponding to the plurality of voice recognition commands. The plurality of voice recognition commands may include commands such as 'turn on', 'turn off', or 'raise volume'. The plurality of control command information may include inherent control information regarding operations or functions which are to be performed by the electronic device 1 corresponding to the plurality of voice recognition commands.

If the electronic device 1 is turned on, the electronic device 1 may request the analysis server 2 to transmit the voice recognition command list 231. In response to receiving the request to transmit the voice recognition command list 231 from the electronic device 1, the analysis server 2 may transmit the voice recognition command list 231 to the electronic device 1. The electronic device 1 may store, in the storage unit 15, the voice recognition command list 231 transmitted by the analysis server 2. If the storage unit 15 already has the voice recognition command list 151 stored therein, the electronic device 1 may compare the stored voice recognition command list 151 with the voice recognition command list 231 which has been transmitted by the analysis server 2, and update the stored voice recognition command list 151 based on the received voice recognition command list 231.

Figure 6:
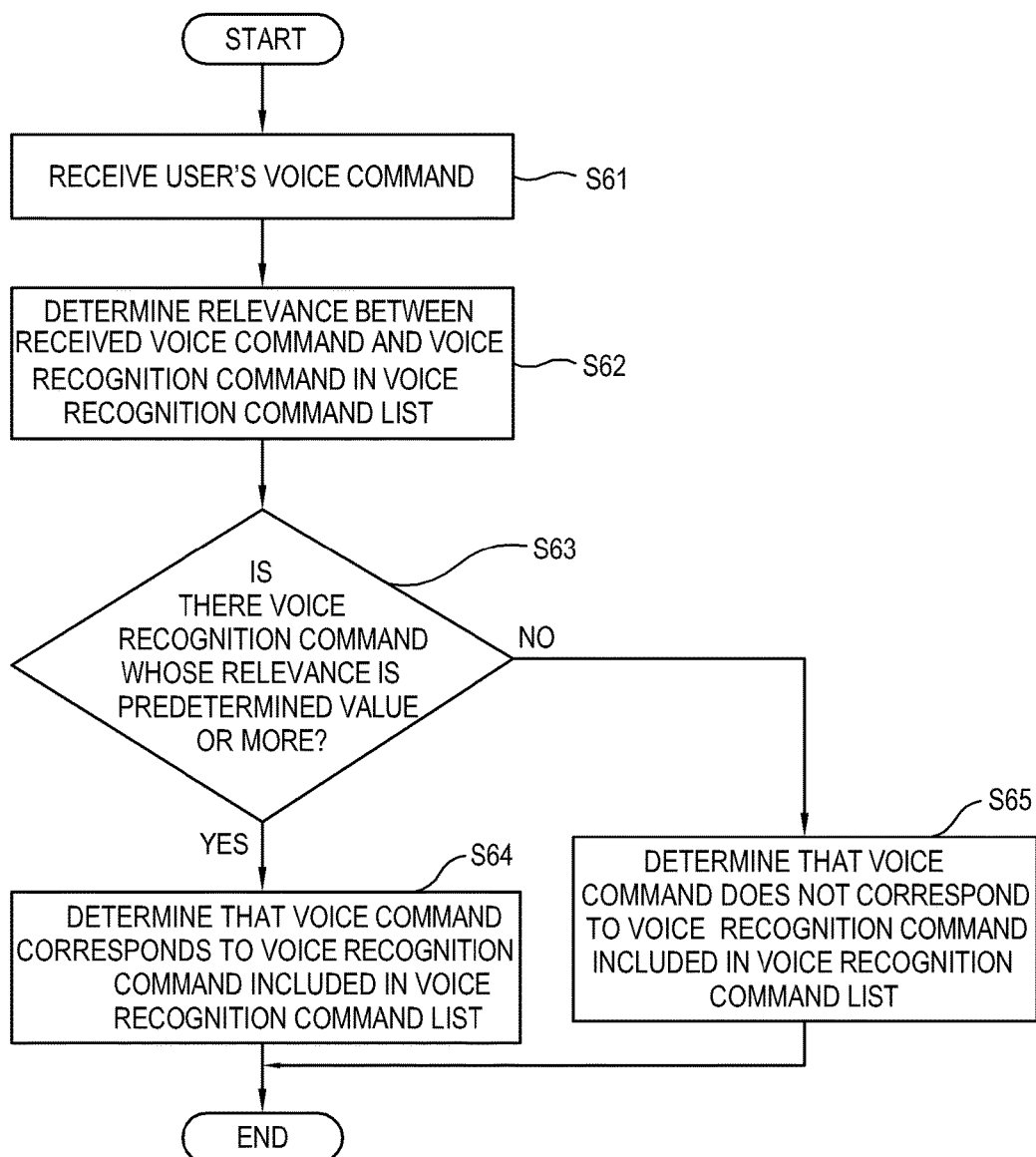
FIG. 6 is a flowchart showing an operation of determining the possibility of analysis by an electronic device according to an exemplary embodiment.

Referring back to FIG. 4, at operation S42, the electronic device 1 receives a user's voice command. At operation S43, the electronic device 1 identifies whether the received user's voice command corresponds to the voice recognition command included in the received voice recognition command list 231. FIG. 6 is a flowchart showing an operation of determining whether the voice command corresponds to the voice recognition command included in the received voice recognition command list 231.

At operation S61, the electronic device 1 receives a user's voice command. At operation S62, the electronic device 1 determines whether the received voice command corresponds to a voice recognition command included in the voice recognition command list 151. The relevance according to the present exemplary embodiment may be determined, e.g., by how similar the received voice command is to the voice recognition command included in the voice recognition command list 151. For example, if a user says a command 'turn off', and the voice recognition command list 151 includes a voice recognition command 'turn off' which is substantially the same as or similar to the command said by the user, it may be determined that the voice command is the most relevant to the voice recognition command in the voice recognition command list 151. As another example, if a user says a command 'raise volume', and the voice recognition command list 151 includes a voice command 'volume up', the two cases may be highly related. In this case, the electronic device 1 may determine that the relevance between the voice command and the corresponding voice recognition command in the voice recognition command list 151 is of at least a predetermined value or more. As another example, if a user says a command 'make screen brighter', and if it is identified that the voice recognition command list 151 does not have any similar voice recognition command, the electronic device 1 may determine that the relevance between the voice command and the corresponding voice recognition command in the voice recognition command list 151 is of less than the predetermined value.

Returning to FIG. 6, at operation S63, if it is determined that the voice recognition command list 151 includes a voice recognition command whose relevance to the voice command is of a predetermined value or more, the electronic device 1 determines that the voice command corresponds to the voice recognition command included in the voice recognition command list 151 at operation S64. On the contrary, if it is determined that the voice recognition command list 151 does not have any voice command whose relevance to the voice command is of the predetermined value or more, the electronic device 1 determines that the voice command does not correspond to the voice recognition command included in the voice recognition command list 151 at operation S64.

Returning to FIG. 4, if it is determined that the user's voice command corresponds to the voice recognition command in the received voice recognition command list 151 at operation S44, the electronic device 1 operates according to the control command information corresponding to the voice recognition command in the voice recognition command list 151 at operation S45. For example, the electronic device 1 performs operations by referring to the control command information corresponding to the voice recognition commands such as 'turn off' and 'volume up' included in the voice recognition command list 151, corresponding to the user's voice commands such as 'turn off' and 'raise volume'.

At operation S46, if it is determined that the user's voice command does not correspond to the voice recognition command included in the received voice recognition command list 151, the electronic device 1 transmits the user's voice command to the analysis server 2 at operation S46. For example, if the user's voice command 'make screen brighter' is not identified based on the voice recognition command list 151, the electronic device 1 transmits information of the voice command 'make screen brighter' to the analysis server 2. At operation S47, the electronic device 1 receives control command information corresponding to the voice command from the analysis server 2. For example, the electronic device 1 receives control command information corresponding to the voice command as the analysis result of the voice command 'make screen brighter'. At operation S48, the electronic device 1 operates according to the received control command information.

Figure 12:
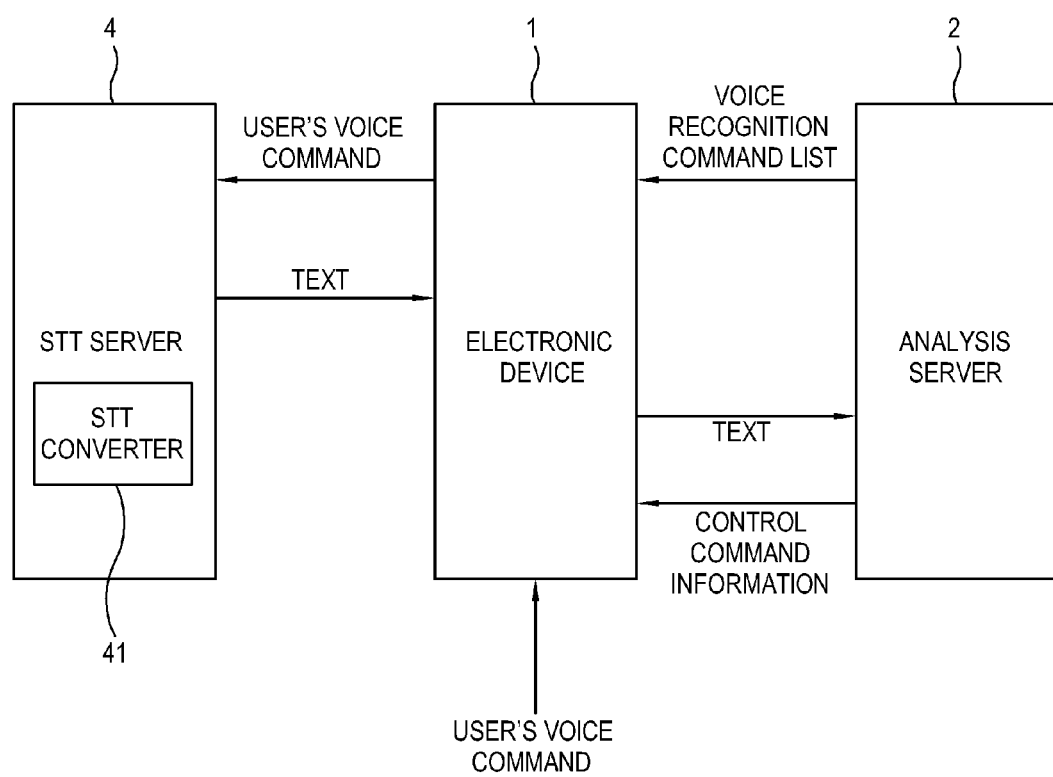
FIG. 12 is a block diagram of an electronic device, an analysis server, and a speech-to-text (STT) server according to an exemplary embodiment.

FIG. 12 illustrates an example of a speech-to-text (STT) server 4 according to an exemplary embodiment. The electronic device 1 may process the information regarding the user's voice command, i.e., the voice made by the user, into a text. For example, the electronic device 1 transmits the received user's voice command to the STT server 4. The STT server 4 includes an STT converter 41 which converts the user's voice command transmitted by the electronic device 1 into a corresponding text. The STT server 4 transmits the text into which the user's voice command has been converted, to the electronic device 1. The electronic device 1 may determine, on the basis of the text transmitted by the STT server 4, whether the user's voice command corresponds to the voice recognition command included in the stored voice recognition command list. The electronic device 1 may transmit the text provided by the STT server 4 to the server 1 and request the server 1 to analyze the user's voice command.

Figure 7:
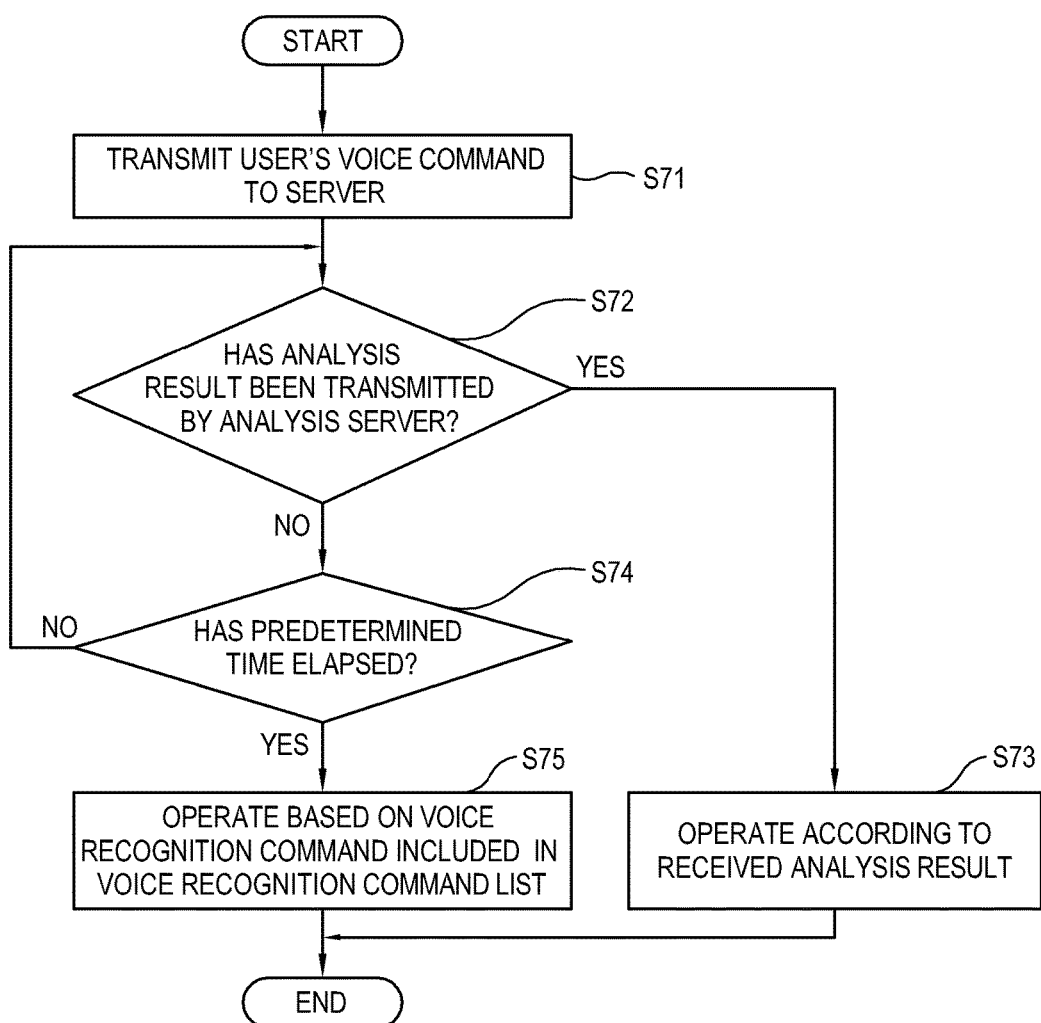
FIG. 7 is a flowchart showing another example of operations of an electronic device according to an exemplary embodiment.

FIG. 7 is a flowchart showing another example of operations of an electronic device 1 according to an exemplary embodiment. In the present exemplary embodiment, the case where the user's voice command is determined to not correspond to the voice recognition command in the received voice recognition command list 151 will be explained. At operation S71, the electronic device 1 transmits a user's voice command to the analysis server 2. At operation S72, the electronic device 1 identifies whether the control command information corresponding to the user's voice command has been received from the analysis server 2. If the electronic device 1 has received the control command information corresponding to the user's voice command from the analysis server 2, the electronic device 1 operates according to the control command information transmitted by the analysis server 2 at operation S73. If the electronic device 1 has not received the control command information corresponding to the user's voice command from the analysis server 2, the electronic device 1 identifies whether a predetermined time has elapsed after the user's voice command has been transmitted to the analysis server 2 at operation S74. If the predetermined time has not elapsed, the operation S72 is performed again. On the contrary, if the predetermined time has elapsed, the electronic device 1 operates under the voice recognition command in the received voice recognition command list 151 at operation S74.

For example, if a user says a command 'reduce screen', the electronic device 1 may determine that the voice recognition command list has the voice command 'make screen smaller' and the relevance between the two commands is less than a predetermined value. Accordingly, in this case, the electronic device 1 requests the analysis server 2 for the analysis result. However, if it takes a long time to receive the analysis result from the analysis server 2 due to communication conditions, etc., it may be inconvenient or difficult for a user to wait a long time until the operation is performed. In this case, if a predetermined time elapses after the electronic device 1 requests the analysis server 2 for the analysis result, the electronic device 1 may promptly operate under the voice recognition command the relevance of which is less than a predetermined value. For example, the electronic device 1 operates under a voice recognition command 'make screen smaller' in the voice recognition command list 151 corresponding to the user's voice command 'reduce screen'. If there are several voice recognition commands which are related to the voice command, the electronic device 1 may firstly select the most related voice recognition command of the plurality of voice recognition commands for its operation. In the present exemplary embodiment, the time during which a user awaits the operation may be minimized to thereby improve user's convenience.

Figure 8:
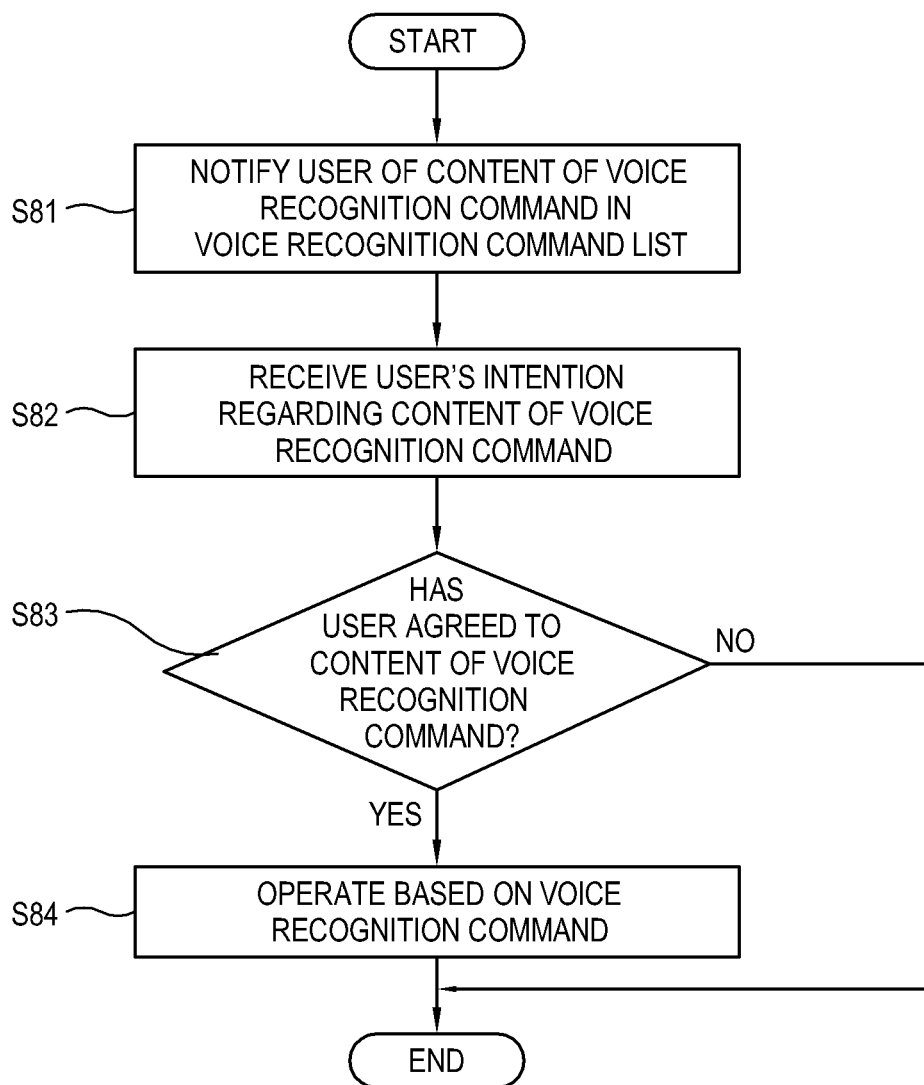
FIG. 8 is a flowchart showing another example of operations of an electronic device according to an exemplary embodiment.

According to another exemplary embodiment, using a voice recognition command whose relevance is low may not be consistent with a user's intention, and thus such an operation may be prevented. FIG. 8 is a flowchart showing another example of operations of an electronic device 1 according to an exemplary embodiment. In the present exemplary embodiment, the case where a predetermined time has elapsed after the electronic device 1 has requested the analysis server 2 for an analysis and there exists a voice recognition command which is determined to be related to the voice command to a certain extent will be explained. At operation S81, the electronic device 1 notifies a user of the content of the voice recognition command before the electronic device 1 operates under the voice recognition command which has been determined to be related to the voice command to a certain extent. More specifically, the electronic device 1 may display on the display unit 113 a message which asks a user whether a current user's voice command falls under a voice recognition command which has been determined to be related to a certain extent. For example, if a user says a voice command 'reduce screen', a message asking a user whether the voice recognition command 'make screen smaller' in the voice recognition command list 151 is consistent with a user's intention. At operation S82, the electronic device 1 receives a user's intention regarding the voice recognition command through the second command receiver 122. If it is determined that a user agrees with the voice recognition command at operation S83, the electronic device 1 operates under the voice recognition command at operation S84. On the contrary, if it is determined that a user does not agree with the voice recognition command at operation S84, the electronic device 1 does not operate under the voice recognition command. Accordingly, in the present exemplary embodiment, the electronic device 1 operates more similarly to a user's intention to thereby improve a user's convenience.

According to another exemplary embodiment, if no voice recognition command in the voice recognition command list 151 corresponds to the user's voice command, the electronic device 1 may display a plurality of voice recognition commands included in the voice recognition command list 151, and enable a user to select one of the plurality of voice recognition commands which is consistent with the user's intention regarding the voice command. If a user selects one of the plurality of voice recognition commands, the electronic device 1 operates based on the control command information corresponding to the selected voice recognition command.

Under the situation that the stored voice recognition command list 151 does not include a voice recognition command corresponding to the user's voice command, if it is determined based on the user's intention that the user's voice command is newly and successfully recognized, the electronic device 1 adds, to the voice recognition command list 151, control command information which is used to correspond to the recognized voice command and stores the information. In this case, the electronic device 1 may transmit the recognized voice command and the corresponding control command information to the analysis server 2, which updates the voice recognition command list 231.

Figure 13:
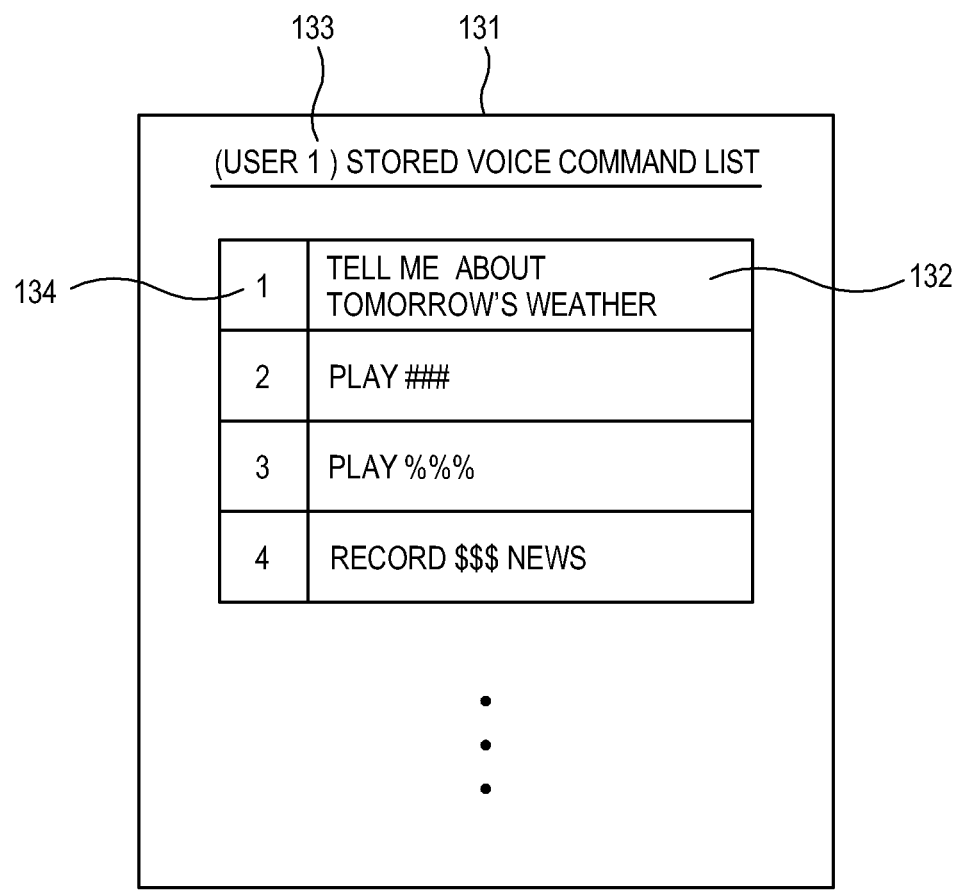

FIG. 13 illustrates an example of a user interface (UI) 131 which shows a list of voice commands stored according to an exemplary embodiment. The electronic device 1 stores therein the voice command said by a user, and upon a user's request, may display the list of the stored voice commands as a UI 131. As shown in FIG. 13, the list of the stored voice commands displayed as the UI 131 shows voice commands 132 which have been said by a user. The electronic device 1 may store the voice commands per user, and show the stored voice commands 132 per user (reference numeral 133). The electronic device 1 may display the list of the stored voice commands in which the voice commands 132 are sorted in order of how many times the voice commands 132 have been said by a user. Accordingly, a user may easily view the voice commands that the user has previously said, through the UI 131, and conveniently say the voice commands.

According to an exemplary embodiment, identification symbols may be registered (e.g., stored) by a user per voice command, and if a user says the registered identification symbol later, the electronic device 1 may determine that the corresponding voice command has been received. The UI 131 showing the list of stored voice commands may further display an identification symbol 134 corresponding to each voice command. For example, if the identification symbol 1 is registered for a voice command such as 'tell me about tomorrow's weather', upon saying the identification symbol '1' by a user, the electronic device 1 determines that the voice command 'tell me about tomorrow's weather' has been input. Accordingly, a user may replace a voice command having a long or complicated sentence, with a simple identification symbol, for the sake of convenience. The electronic device 1 may delete any voice command from the list of the UI 131 or add a new voice command thereto under a user's instruction.

According to another exemplary embodiment, if a user says a location where one voice command is arranged in the UI 131 of the list of voice commands, the electronic device 1 may determine that the voice command has been received. For example, if a user says 'first' while the UI 131 of the list is displayed, the electronic device 1 may determine that the voice command 'tell me about tomorrow's weather' ranked on top in the UI 131 of the list has been said.

The electronic device 1 may edit the order of voice commands in the UI 131 of the list of the stored voice commands under a user's instruction. FIG. 14 illustrates such a situation in which the order of the voice commands in the UI 131 is edited. For example, as shown in FIG. 14, the electronic device 1 may exchange the order of the command 'play %%%' and 'record $$$ news' under a user's instruction. In this case, the corresponding identification symbol may be maintained or identification symbols of the two commands may be exchanged.

Figure 9:
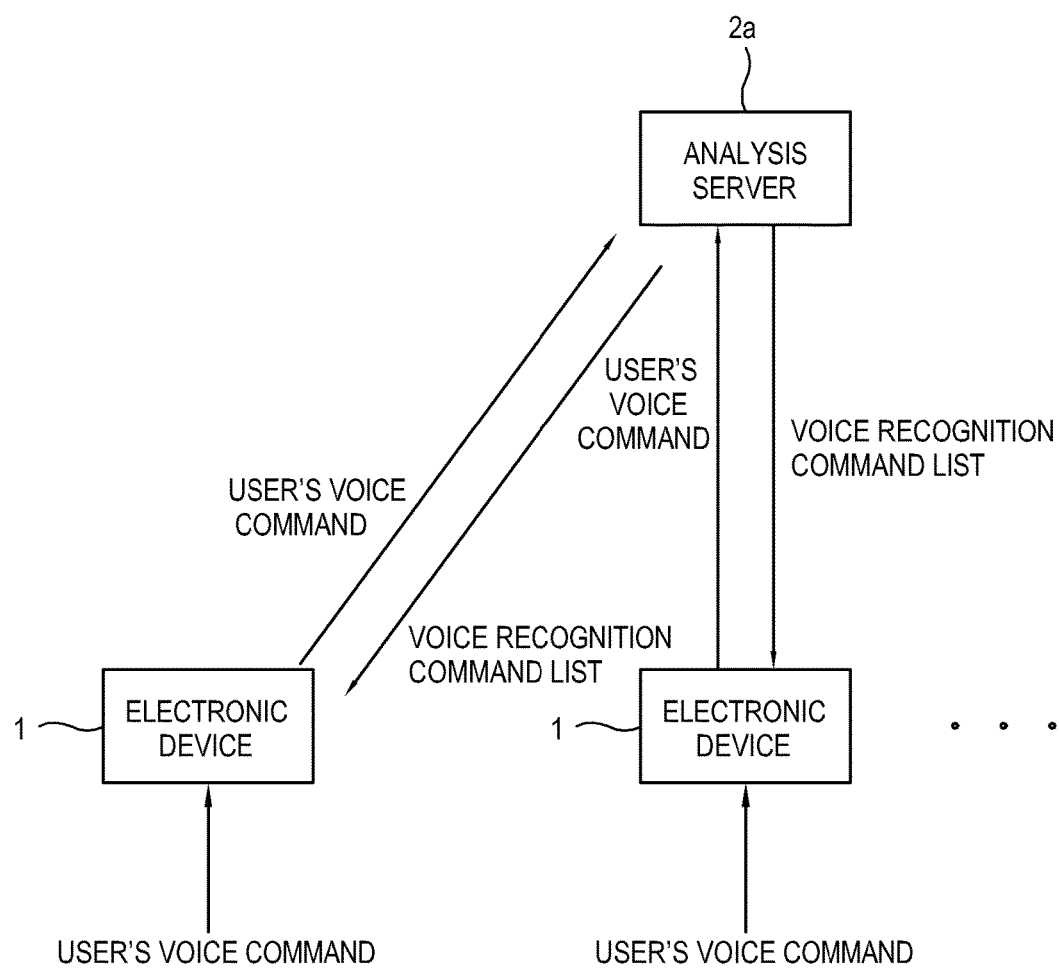
FIG. 9 illustrates an example of an electronic device and an analysis server according to an exemplary embodiment.

FIG. 9 illustrates an example of an electronic device 1 and an analysis server 2*a* according to an exemplary embodiment. Explanations of configurations of the analysis server 2*a* which are the same as or similar to the configurations of the analysis server 2 which has been explained with reference to FIGS. 1 to 8 will not be repeated. The analysis server 2*a* according to the present exemplary embodiment communicates with a plurality of electronic devices 1. Upon receiving a request from the plurality of electronic devices 1 for analysis of a user's voice command, the analysis server 2*a* analyzes the voice command and transmits the analysis result to the electronic device 1. The analysis server 2*a* collects user's voice commands transmitted by the plurality of electronic devices 1, prepares a voice recognition command list 231 based on the voice commands, and transmits the prepared voice recognition command list 231 to the plurality of electronic devices 1.

Figure 10:
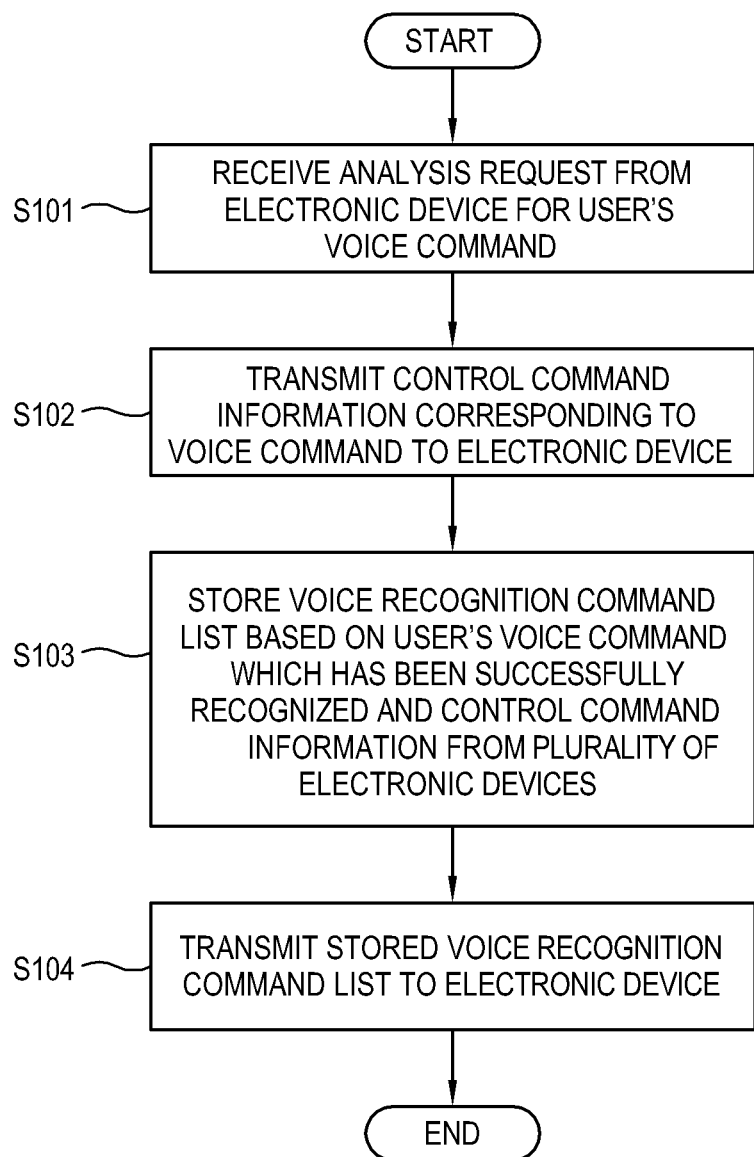
FIG. 10 is a flowchart showing operations of a server according to an exemplary embodiment.

FIG. 10 is a flowchart showing operations of an analysis server 2*a* according to an exemplary embodiment. At operation S101, the analysis server 2*a* receives a request from the electronic device 1 for analysis of the user's voice command. At operation S102, the analysis server 2*a* analyzes the voice command and transmits control command information corresponding to the analysis result to the electronic device 1. At operation S103, the analysis server 2*a* prepares a voice recognition command list 231 based on the user's voice commands collected from the plurality of electronic devices 1 and the analysis result, and stores in the storage unit 23 the prepared voice recognition command list 231. The analysis server 2a may update a voice recognition command list 231 stored in the storage unit 23 based on the user's voice command continuously collected from the plurality of electronic devices 1 and the analysis result thereof. At operation S103, the analysis server 2a transmits the voice recognition command list 231 stored in the storage unit 23, to the plurality of electronic devices 1.

According to an exemplary embodiment, as explained above with reference to FIG. 8, if there is a voice command which has been determined to be less related to the voice recognition command in the voice recognition command list but has been requested by a user (has been newly and successfully recognized) to operate, the electronic device 1 may transmit the recognized voice command and corresponding control command information to the analysis server 2a. In this case, the analysis server 2a may reflect the received voice command and corresponding control command information in the voice recognition command list 231. According to an exemplary embodiment, the analysis server 2a may add a voice recognition command to the voice recognition command list 231 if the analysis server 2a receives the recognized voice command and corresponding control command information a predetermined number of times, or from a predetermined number of electronic devices 1.

Figure 11:
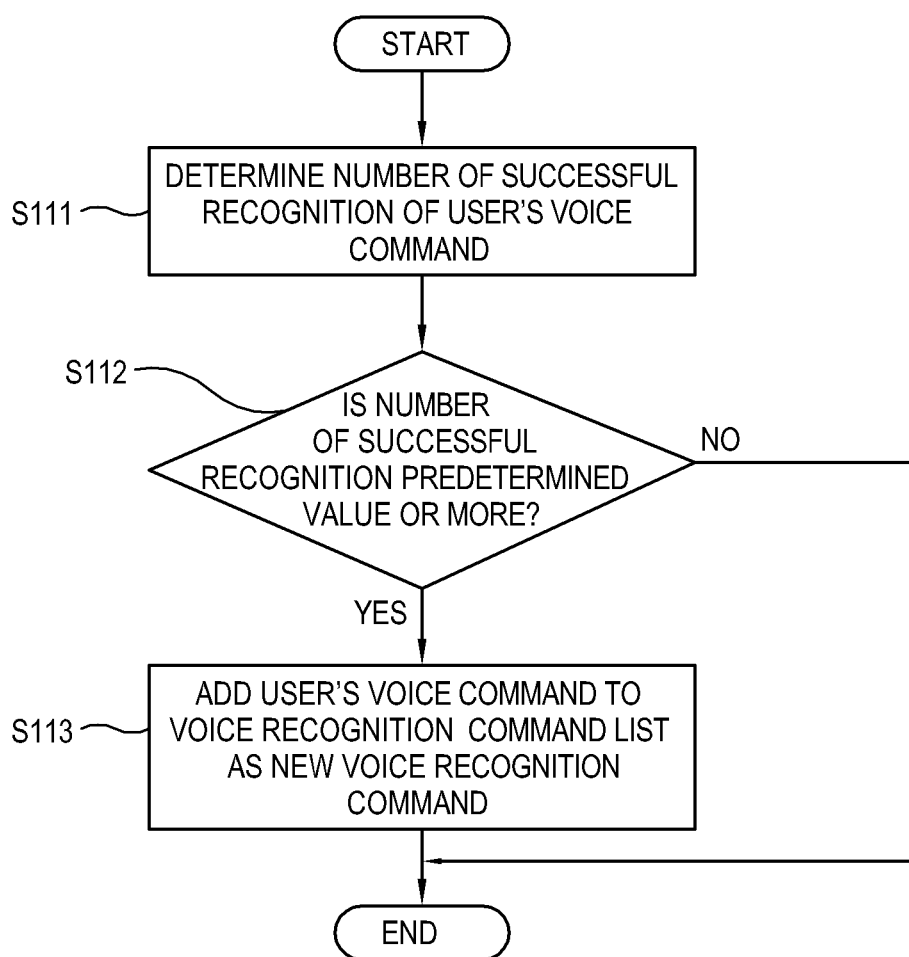
FIG. 11 is a flowchart showing operations of a server according to an exemplary embodiment.

FIG. 11 is a flowchart showing operations of the analysis server 2a according to an exemplary embodiment. At operation S101, the analysis server 2a determines the number of successful recognitions of the user's voice commands collected from the plurality of electronic devices 1. That is, the analysis server 2a determines which of the user's voice commands collected from the plurality of electronic devices 1 is frequently recognized successfully. At operation S102, the analysis server 2a determines whether the number of successful recognition of the user's voice command collected is a predetermined value or more. If the number of the successful recognition of the voice command is a predetermined value or more, the analysis server 2a may add the voice command and the control command information to the voice recognition command list as a new voice recognition command at operation S103. If the number of the successful recognition of the voice command is less than the predetermined value, the analysis server 2a does not add the voice command and the control command information to the voice recognition command list. According to the present exemplary embodiment, the voice recognition command list adds only the voice commands whose successful recognition number is a predetermined value or more, and thus, the transmission time for the voice recognition command list and the operation of the electronic device 1 for processing the voice recognition command list may be minimized.

As described above, the time for recognizing a user's command and performing operations may be minimized in a method of recognizing the user's command through a server.

While the above-described exemplary embodiments are with reference to a voice command, it is understood that one or more other exemplary embodiments are not limited thereto. For example, another exemplary embodiment may be applicable to any one or more kinds of commands, such as a gesture command. In this case, by way of example, a command list may include gesture recognition commands and corresponding control command information.

Furthermore, while the above-described exemplary embodiments are with reference to a first server, it is understood that one or more other exemplary embodiments are not limited thereto, and may be applicable to plural first servers.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units, components, elements, etc., of the above-described devices can include circuitry, a processor, a microprocessor, etc., and may execute a computer program stored in a computer-readable medium.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
   a processor configured to process a signal;
   a display configured to display an image based on the processed signal;
   a voice command receiver configured to receive a voice command from a user; and
   a storage configured to store a voice command list to command the display apparatus to perform processes respectively corresponding to a plurality of voice commands which previously were said by a user;
   a controller configured to control to:
      if the received voice command is included in the voice command list, perform an operation based on one of control commands in the voice command list corresponding to the received voice command, and if the received voice command is not included in the voice command list, connect to an external server to transmit the received voice command to the external server, and receive a control command corresponding to the transmitted voice command from the external server and update the voice command list by adding the received control command to the voice command list,
   wherein the voice command list is a list of commands that have successfully been recognized a predetermined number of times or more.

2. The display apparatus according to claim 1, wherein the controller controls to store the plurality of voice commands of the voice command list per user and to show the stored voice commands per user.

3. The display apparatus according to claim 1, wherein the controller controls to store the plurality of voice commands of the voice command list, controls to register identification symbols to the stored plurality of voice commands and if the user says a registered identification symbol, determines that a corresponding voice command has been received.

4. The display apparatus according to claim 1, wherein the controller controls to display the voice command list, and if the user says a location where one voice command is arranged in the displayed voice command list, the controller determines that the voice command has been received.

5. The display apparatus according to claim 1, wherein the controller controls to display the voice command list, and to edit an order of voice commands in the displayed voice command list under a user's instruction.

6. The display apparatus according to claim 1, wherein the voice commands are commands that have successfully been recognized by the display apparatus a predetermined number of times or more.

7. The display apparatus according to claim 6, wherein the voice commands are received from a server.

8. The display apparatus according to claim 1, wherein the controller displays the voice command list in order of how many times each of the plurality of voice commands have been previously recognized.

9. The display apparatus according to claim 1, wherein the plurality of voice commands are received from a server and are commands that are determined to have been, prior to being received from the server, recognized the predetermined number of times or more.

10. A control method of a display apparatus, the control method comprising:

storing a voice command list to command the display apparatus to perform processes respectively corresponding to a plurality of voice commands which previously were said by a user;

receiving a voice command from a user;

if the received voice command is included in the voice command list, performing an operation based on one of control commands in the voice command list corresponding to the received voice command; and if the received voice command is not included in the voice command list, connecting to an external server to transmit the received voice command to the external server, receiving a control command corresponding to the transmitted voice command from the external server, and updating the voice command list by adding the received control command to the voice command list, wherein the voice command list is a list of commands that have successfully been recognized a predetermined number of times or more.

11. The control method according to claim 10, wherein the storing comprises storing the plurality of voice commands of the voice command list per user, and the method further comprises showing the stored voice commands per user.

12. The control method according to claim 10, further comprising storing the plurality of voice commands of the voice command list, wherein the storing comprises registering identification symbols to the stored plurality of voice commands, and the determining comprises, if the user says a registered identification symbol, determining that a corresponding voice command has been received.

13. The control method according to claim 10, further comprising displaying the voice command list, wherein the determining comprises, if the user says a location where one voice command is arranged in the displayed voice command list, determining that the voice command has been received.

14. The control method according to claim 10, further comprising displaying the voice command list, and editing an order of voice commands in the displayed voice command list under a user's instruction.

* * * * *